(12) United States Patent
Patanapongpibul (10) Patent No.: US 11,877,345 B2
(45) Date of Patent: Jan. 16, 2024

(54) SYSTEM AND METHOD FOR DISPLAYING A CUSTOM NETWORK NAME IN A MOBILE DEVICE

(71) Applicant: SITA Switzerland Sàrl, Cointrin (CH)

(72) Inventor: Leo Boonchin Patanapongpibul, Geneva (CH)

(73) Assignee: SITA Switzerland Sàrl

( * ) Notice: Subject to any disclaimer, the term of this patent is extended or adjusted under 35 U.S.C. 154(b) by 180 days.

(21) Appl. No.: 17/417,325

(22) PCT Filed: Dec. 20, 2019

(86) PCT No.: PCT/EP2019/086636
§ 371 (c)(1),
(2) Date: Jun. 22, 2021

(87) PCT Pub. No.: WO2020/136116
PCT Pub. Date: Jul. 2, 2020

(65) Prior Publication Data
US 2022/0078600 A1    Mar. 10, 2022

(30) Foreign Application Priority Data
Dec. 24, 2018  (GB) .................................. 1821190

(51) Int. Cl.
*H04W 8/06*  (2009.01)
*H04W 8/12*  (2009.01)
(Continued)

(52) U.S. Cl.
CPC .............. *H04W 8/06* (2013.01); *H04W 8/12* (2013.01); *H04W 8/26* (2013.01); *H04W 48/12* (2013.01);
(Continued)

(58) Field of Classification Search
CPC ........... H04W 8/06; H04W 8/12; H04W 8/26; H04W 48/12; H04W 60/04; H04W 84/005; H04W 84/042; H04W 8/02; H04W 60/00
See application file for complete search history.

(56) References Cited

U.S. PATENT DOCUMENTS

2005/0213566 A1   9/2005  Jutila et al.
2006/0236325 A1 * 10/2006  Rao ......................... H04W 4/50
                                                            455/424
(Continued)

FOREIGN PATENT DOCUMENTS

EP     2120492 A1   11/2009
EP     2285162 A1    2/2011
(Continued)

OTHER PUBLICATIONS

International Search Report & Written Opinion issued in International Application No. PCT/EP2019/086636, dated Aug. 4, 2020; 11 pages.

(Continued)

*Primary Examiner* — Mazda Sabouri
(74) *Attorney, Agent, or Firm* — Morris, Manning & Martin, LLP; Daniel E. Sineway, Esq.; Adam J. Thompson, Esq.

(57) ABSTRACT

An apparatus for controlling telecommunication signalling, comprising: a user equipment interface configured to send an identify request to a user equipment device in response to receiving a request to update location and to subsequently receive an identify response from the user equipment device; and control logic configured to extract and identify the mobile country code and the mobile network code of the user equipment device from the identify response. The control logic is further configured to set one or more network name entries in a mobility management information mes- (Continued)

sage, based on the identified mobile country code and mobile network code of the user equipment device, to produce a custom mobility management information message. The user equipment interface is further configured to forward the custom mobility management information message to the user equipment device.

20 Claims, 4 Drawing Sheets

(51) Int. Cl.
    *H04W 8/26*     (2009.01)
    *H04W 48/12*     (2009.01)
    *H04W 60/04*     (2009.01)
    *H04W 84/00*     (2009.01)
    *H04W 84/04*     (2009.01)

(52) U.S. Cl.
    CPC .......... *H04W 60/04* (2013.01); *H04W 84/005* (2013.01); *H04W 84/042* (2013.01)

(56) References Cited

U.S. PATENT DOCUMENTS

| | | |
|---|---|---|
| 2011/0086625 A1 | 4/2011 | Inlow et al. |
| 2013/0171988 A1 | 7/2013 | Yeung et al. |
| 2015/0133116 A1 | 5/2015 | Lauer et al. |
| 2020/0236610 A1* | 7/2020 | Martin ............. H04W 12/35 |
| 2020/0344678 A1* | 10/2020 | Kunz ............... H04W 48/18 |
| 2021/0368345 A1* | 11/2021 | Nakarmi ........... H04W 12/06 |

FOREIGN PATENT DOCUMENTS

| | | |
|---|---|---|
| EP | 2723109 A1 | 4/2014 |
| KR | 1020100061015 A | 1/2012 |
| WO | 2014029059 A1 | 2/2014 |
| WO | 2015028083 A1 | 3/2015 |
| WO | 2020136116 A1 | 7/2020 |

OTHER PUBLICATIONS

Notification Concerning Transmittal of International Preliminary Report on Patentability (Chapter I of the Patent Cooperation Treaty), issued in International Application No. PCT/EP2019/086636, dated Jun. 16, 2021; 2 pages.
Combined Search and Examination Report under Sections 17 and 18(3), dated Jun. 10, 2019; 5 pages.
Communication under Rule 71(3) EPC issued in EP Application No. 198297.3, dated Oct. 20, 2022.
3GPP TSG-SA WG2 Meeting #70, Jan. 16, 2009.
Alcatel-Lucent 3GPP Draft, "Discussion on PLMN Identity Indication in CS and PS Domains for GERAN Sharing," Oct. 2011; 6 pages.
Combined Search and Examination Report issued in GB Application No. 1821190.4, dated Jun. 10, 2019; 2 pages.

\* cited by examiner

SYSTEM AND METHOD FOR DISPLAYING A CUSTOM NETWORK NAME IN A MOBILE DEVICE

CROSS REFERENCE TO RELATED APPLICATIONS

This application is a national phase application of, and claims benefit of and priority to International Application No. PCT/EP2019/086636, filed Dec. 20, 2019, entitled "A SYSTEM AND METHOD FOR DISPLAYING A CUSTOM NETWORK NAME IN A MOBILE DEVICE," which claims priority to Great Britain Application No. 1821190.4, filed Dec. 24, 2018, entitled "A SYSTEM AND METHOD FOR CONTROLLING MOBILE DEVICE SIGNALLING," the disclosures of which are incorporated herein by reference as if set forth herein in their entireties.

This application relates to a system and method for controlling mobile device telecommunication signalling, in particular it relates to the dynamic modification and customisation of telecommunication signal values, such as a network name.

Telecommunications networks and the corresponding infrastructure are typically owned and operated by, or for, a single mobile network operator with multiple telecommunications networks operated by different mobile network operators having coverage in any given area. This is because the different mobile network operators compete to provide as complete a terrestrial network coverage as possible.

However, when implementing telecommunications networks at high altitudes, for example for coverage on aircraft, a number of different parties are typically involved in the provision of the end-to-end solution. This is because the overall cost of operating such a mobile network is very high and typically involves ground based systems, satellite relays and specialist avionics systems for the provision of the mobile network base station, which is usually provided in the form of a picocell base station on the aircraft itself.

Telecommunications network signalling was not designed to accommodate the identification of a plurality of different parties and so it is not possible to do so at the moment within the current systems and telecommunications standards, such as 3rd Generation Partnership Project (3GPP)® Technical Specification (TS) 24.008 Release 15.3.0 for Global System for Mobile communications (GSM)®/Universal Mobile Telecommunication System (UMTS)® and TS 24.301 Release 15.4.0 for Long Term Evolution (LTE)® Evolved Packet System (EPS). Therefore, the applicant has appreciated that it would be desirable to provide an apparatus for controlling telecommunication signalling to expand the means of identification possible within the current technical standards while maintaining hardware interoperability.

SUMMARY OF THE INVENTION

The invention is defined in the independent claims to which reference should now be directed. Advantageous features are set out in the dependent claims.

In a first aspect of the present disclosure, an apparatus for controlling telecommunication signalling is described. The apparatus comprises a user equipment interface configured to send an identify request to a user equipment device in response to receiving a request to update location and to subsequently receive an identify response from the user equipment device; and control logic configured to extract and identify a representation of the mobile country code and the mobile network code of the user equipment device from the identify response. The control logic is further configured to set one or more network name entries in a mobility management information message, based on the identified representation of the mobile country code and mobile network code of the user equipment device, to produce a custom mobility management information message; and the user equipment interface is further configured to forward the custom mobility management information message to the user equipment device.

This advantageously enables the apparatus to dynamically set the network name that will be shown on a user equipment device for a given telecommunications network based on the home public land mobile network associated with the user equipment device by the combination of the mobile country code and the mobile network code. Moreover, this enables the same telecommunications network to simultaneously be associated with different network names for users associated with different home public land mobile networks.

Optionally, the control logic may be configured to set the one or more network name entries in the custom mobility management information message based on the identified representation of the mobile country code and mobile network code of the user equipment device using a lookup table or a configuration file. This lookup table/configuration file advantageously stores the correlation between different mobile country code and mobile network code combinations and the one or more modified network names that should be displayed for the telecommunications network.

Optionally, the control logic is further configured to monitor an identification of the user equipment device and to perform a lookup of the identification of the user equipment device in a database or a configuration file to determine whether the user equipment device is associated with a first type or a second type; wherein the user equipment interface is configured to send, for a given telecommunication signalling session, only one custom mobility management information message to a user equipment device determined to be associated with the first type; and wherein the user equipment interface is configured to send a plurality of custom mobility management information messages, throughout a given telecommunication signalling session, to a user equipment device determined to be associated with the second type.

This advantageously enables the apparatus to determine whether the user equipment device is associated with the (second) type, which requires each custom mobility management information message to be set by the apparatus in order for the user equipment device to have continued access to the dynamically modified network name entries during a session of connection to the public land mobile network, or whether the user equipment device is associated with the (first) type, which only requires a single custom mobility management information message to be set by the apparatus, with the dynamically modified network name then being stored by the user equipment device throughout a session of connection to the public land mobile network. This in turn advantageously enables the apparatus to reduce the number of custom mobility management information messages that are required to be set and sent to some user equipment devices and thus improves the total number of user equipment devices that can be serviced by the apparatus.

Optionally, producing the custom mobility management information message comprises: forwarding, from a network interface, the identify response to a public land mobile network; receiving, at the network interface, a mobility management information message in response; and modifying one or more network name entries in the mobility management information message, based on the identified representation of the mobile country code and mobile network code of the user equipment device, to produce the custom mobility management information message. This arrangement provides the apparatus as a standalone unit (which may for example be implemented in software, hardware, firmware, or any combination of these) that may be placed in the communication path between the user equipment device and the public land mobile network.

Optionally, the one or more network name entries in the mobility management information message may comprise a short network name and a full network name. Optionally, the public land mobile network is a visited public land mobile network. Optionally, the visited public land mobile network is configured to provide telecommunication service on an aircraft and/or a cruise ship.

Optionally, the apparatus may be configured to receive and modify mobility management information messages at the network level; this advantageously simplifies the implementation of the apparatus with the Universal Mobile Telecommunications System (UMTS)® networks. Optionally, the apparatus may form part of a network switch. This advantageously simplifies the implementation of the apparatus with Long Term Evolution (LTE)® networks.

Optionally, the apparatus may form part of a visitor location register for a network base station or part of a mobility management entity. This advantageously simplifies the implementation of the apparatus with UMTS® networks and LTE® networks respectively, as well as other similar networks as will be appreciated by the skilled person.

Optionally, two apparatuses according to the first aspect of the disclosure may be provided and arranged to operate in a redundant backup configuration with one apparatus configured to operate as a redundant backup for the other apparatus. This advantageously avoids the presence of a single point of failure between the base station and the ground network infrastructure that would limit the reliability of the solution.

According to a second aspect of the present disclosure, a method for controlling telecommunication signalling is provided. The method comprises sending an identify request to a user equipment device in response to receiving a request to update location and subsequently receiving an identify response from the user equipment device; and extracting and identifying a representation of the mobile country code and the mobile network code of the user equipment device from the identify response. The method further comprises setting one or more network name entries in a mobility management information message, based on the identified representation of the mobile country code and mobile network code of the user equipment device, to produce a custom mobility management information message; and forwarding the custom mobility management information message to the user equipment device.

This advantageously enables the method to set the network name that will be shown on a user equipment device for a given telecommunications network based on the home public land mobile network associated with the user equipment device by the combination of the mobile country code and the mobile network code. Moreover, this enables the same telecommunications network to be associated with different network names for users associated with different home public land mobile networks.

Optionally, a lookup table or a configuration file may be used for setting the one or more network name entries in the custom mobility management information message based on the identified representation of the mobile country code and mobile network code of the user equipment device.

Optionally, the method further comprises monitoring an identification of the user equipment device and performing a lookup of the identification of the user equipment device in a database or a configuration file to determine whether the user equipment device is associated with a first type or a second type; and if the user equipment device is determined to be associated with the first type, forwarding only one custom mobility management information message, during a given telecommunication signalling session, to the user equipment device; or if the user equipment device is determined to be associated with the second type, forwarding a plurality of custom mobility management information messages, throughout a given telecommunication signalling session, to the user equipment device.

Optionally, setting one or more network name entries in the mobility management information message comprises: forwarding the identify response to a public land mobile network; receiving a mobility management information message in response; and modifying one or more network name entries in the mobility management information message, based on the identified representation of the mobile country code and mobile network code of the user equipment device, to produce the custom mobility management information message. This arrangement provides the apparatus as a standalone unit (which may for example be implemented in software, hardware, firmware, or any combination of these) that may be placed in the communication path between the user equipment device and the public land mobile network.

Optionally, the one or more network name entries in the custom mobility management information message comprise a short network name and a full network name. Optionally, the public land mobile network is a visited public land mobile network. Optionally, the visited public land mobile network provides telecommunication service on an aircraft and/or a cruise ship.

Optionally, the mobility management information messages may be received and modified at the network level. Optionally, the method may be implemented in a network switch.

Optionally, the method may be implemented in a visitor location register for a network base station or in a mobility management entity.

BRIEF DESCRIPTION OF THE DRAWINGS

Embodiments of the invention will now be described, by way of example only, and with reference to the accompanying drawings, in which.

DETAILED DESCRIPTION

Figure 1:
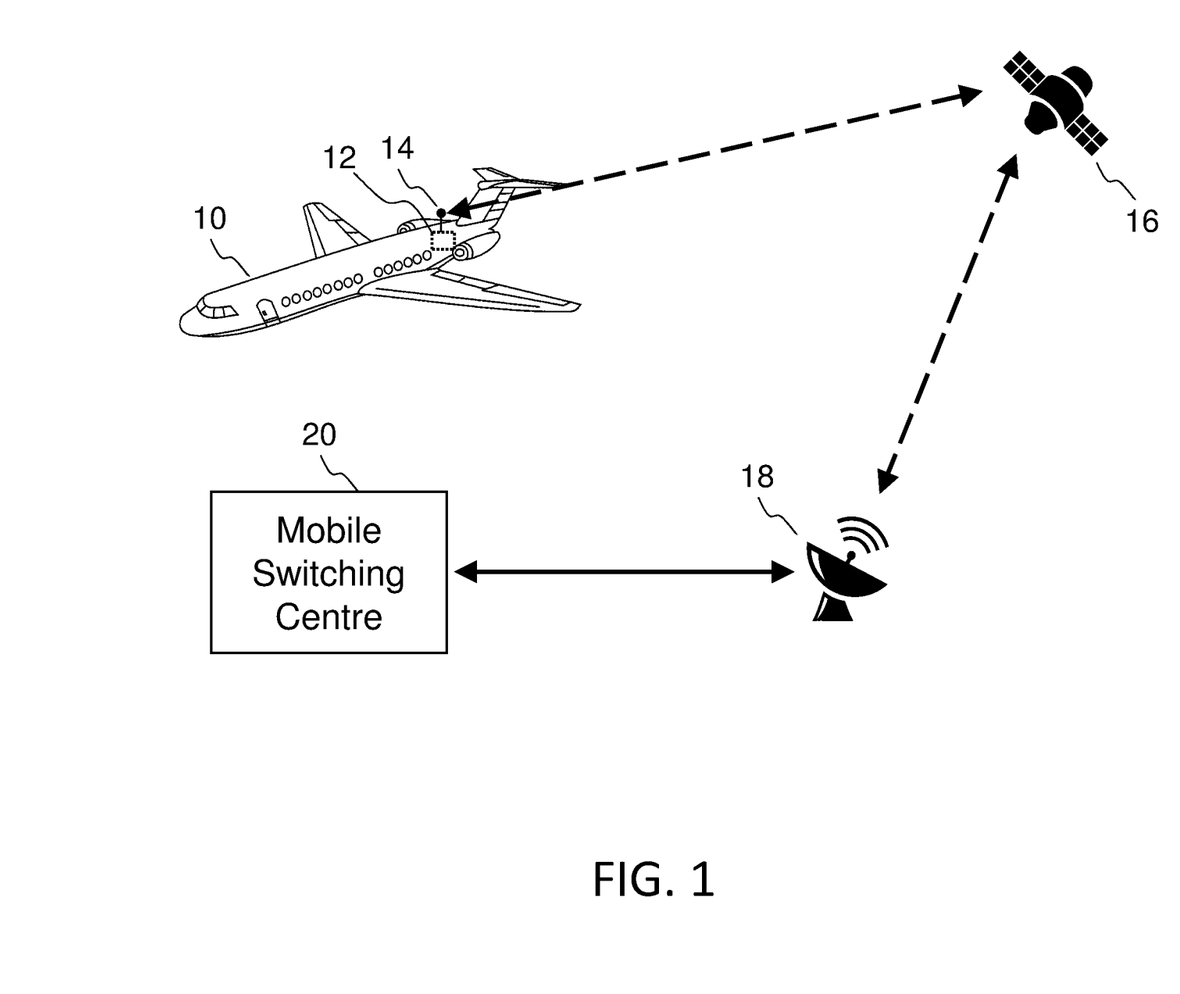
FIG. 1 is a schematic illustration of a telecommunications network for providing mobile device network coverage on aircraft.

FIG. 1 is a schematic illustration of a telecommunications network for providing mobile device network coverage on aircraft flying at high altitude. The aircraft 10 is equipped with a mobile network base station 12, such as a picocell, that is coupled (directly or indirectly) to an antenna 14 or a satellite dish 14 for communicating with a telecommunications satellite 16. The telecommunications satellite 16 can relay messages passed between the base station 12 (via antenna 14) and a ground based transceiver 18 that is connected to the worldwide public switched telephone network (PSTN) (not shown) via a mobile switching centre (MSC) 20.

In this manner, the base station 12 sends and receives communications to and from the PSTN respectively via the mobile switching centre 20, ground based transceiver 18 and telecommunications satellite 16 and thereby extends the coverage of a telecommunications network operating on the PSTN to the aircraft 10. Any mobile devices on board the aircraft 10 can then connect to the base station 12 in order to access the telecommunications network. The base station 12 will include a mobile network antenna (not shown in FIG. 2) for communicating with the mobile devices on board the aircraft 10. Furthermore, the base station 12 may in practice represent a plurality of base stations distributed throughout the aircraft in order to provide even coverage throughout the aircraft.

Typically, the telecommunications network topology and infrastructure may be provided and facilitated by a number of different parties and accordingly the network will usually be considered to be a visited public land mobile network (VPLMN) providing a roaming telecommunication service on the aircraft.

Figure 2:
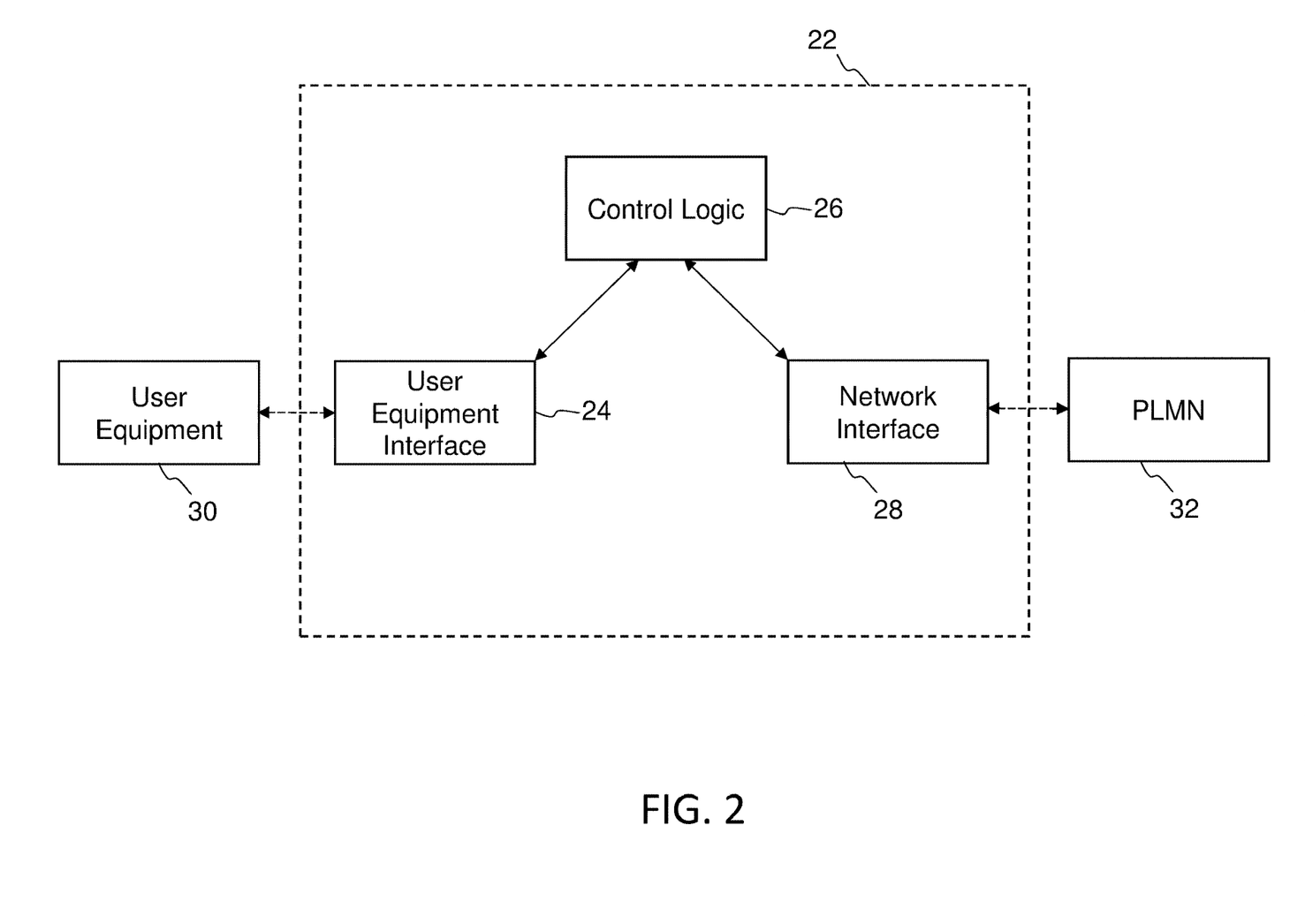
FIG. 2 is a block diagram of a system including an apparatus according to an embodiment of the present disclosure.

FIG. 2 is a block diagram of a system including an apparatus 22 according to an embodiment of the present disclosure. The apparatus 22 comprises a user equipment interface 24, control logic 26 and a network interface 28. The user equipment interface 24 is configured to communicate with one or more user equipment devices (UE) 30. The user equipment interface 24 is further in communication with the control logic 26, which is in turn in communication with the network interface 28. The network interface 28 is also configured to communicate with a public land mobile network (PLMN) 32. As will be described in further detail below, the network interface 28 is optional in some embodiments, for example those embodiments in which the apparatus 22 is integrated into the PLMN 32.

As shown in FIG. 2, the apparatus 22 is placed at a point in the communication path between the user equipment device 30 and a public land mobile network (PLMN) 32. However, there may be a number of other nodes interposed in the communication path between the apparatus 22 and the UE 30/PLMN 32 respectively. This is intended to be represented by the dashed lines of the arrows between these components. As such, the apparatus 22 may be located in the middle of the communication path/channel between the two, or it may be located close (or closer) to either the UE 30 or the PLMN 32. In one embodiment, the apparatus 22 may be integrated into the PLMN 32 itself. Accordingly, the communication path or channel between the UE 30 and the user equipment interface 24 may be a direct connection over an air interface (such as a wireless telecommunications protocol), or it may be via a plurality of intermediate communication nodes.

For example, the apparatus 22 may be located on the aircraft itself and form a part of the base station 12. In such a case, the user equipment interface 24 of the apparatus 22 may communicate directly with the user equipment device 30 using a wireless telecommunications protocol, such as a 3rd Generation Partnership Project (3GPP)® cellular network. The network interface 28 of the apparatus 22 would then communicate with the PLMN 32 via a number of other nodes or relay points, such as the telecommunications satellite 16, the ground based transceiver 18 and the mobile switching centre (MSC) 20.

Alternatively, the apparatus 22 may form part of a gateway MSC 20 itself. In such a case, the network interface 28 of the apparatus 22 may directly interface with the PLMN 32 and the Public Switched Telephone Network (PSTN), while the user equipment interface 24 may communicate with the UE 30 via a number of other nodes or relay points, such as the ground based transceiver 18, the telecommunications satellite 16 and the base station 12. In this case, the network interface 28 may be considered to be an optional feature, since the control logic 26 may be considered to be integrated with the MSC 20 of the PLMN 32.

The UE device 30 typically stores a default network name that is to be displayed on the UE device 30 and corresponds to the PLMN that is associated with the Subscriber Identification Module (SIM card) of the UE device 30. This PLMN is known as the home public land mobile network (HPLMN) and is identified from the combination of the Mobile Country Code (MCC) and the Mobile Network Code (MNC) stored in the SIM card in accordance with ITU-T Recommendation E.212. Together, the MCC and MNC may be referred to as the Home Network Identity (HNI) of the SIM card's subscriber. The corresponding International Mobile Subscription Identity (IMSI) represents the combination of the HNI and a subscriber specific identification known as the Mobile Subscription Identification Number (MSIN). References below to the HNI or IMSI may be used interchangeably.

When the UE device 30 is connected to a PLMN 32 other than the HPLMN, it is considered to be a roaming device and the PLMN 32 may be referred to as a visited public land mobile network (VPLMN). In such a circumstance, the default network name stored in the UE device 30 would not correspond to the VPLMN and accordingly the UE device 30 is configured to obtain a network name to display. A list of default VPLMN names may be stored on the UE device 30, or for example on a SIM card loaded into the UE device 30; however, this may be overridden by a network name sent by the VPLMN, for example in a mobility management information message.

In 3GPP® cellular networks mobility management messages, such as Mobility Management (MM) Information messages that are defined in 3GPP® Technical Standard (TS) 24.008 (in particular in Table 9.2.18 of the current release 15) and TS 24.301 (in particular in Table 8.2.13.1 of the current release 15), are sent from the visited PLMN 32 to the UE 30 and include an identification of a network name corresponding to the PLMN that should be displayed by the UE 30. References below to mobility management information messages will be taken to cover both MM information messages under UMTS® and EMM information messages under LTE® as well as any other corresponding message structure in alternative telecommunications protocols. Specifically, the mobility management Information message includes a "Full name for network" field with Information Element Identifier (IEI) 43 and a "Short name for network" field with IEI 45. These two fields are typically configured by the Mobile Switching Centre (MSC) 20 in known systems and recite a single fixed network name pair for the PLMN 32.

The applicant has appreciated that the means of identification possible in such telecommunication signalling may be expanded to include a plurality of custom network name pairs, while maintaining compliance with the current technical standards and corresponding hardware interoperability, by appropriate processing and modification, or customisation, of the Mobility Management Information messages that are sent from the network to roaming UE devices 30.

Figure 3:
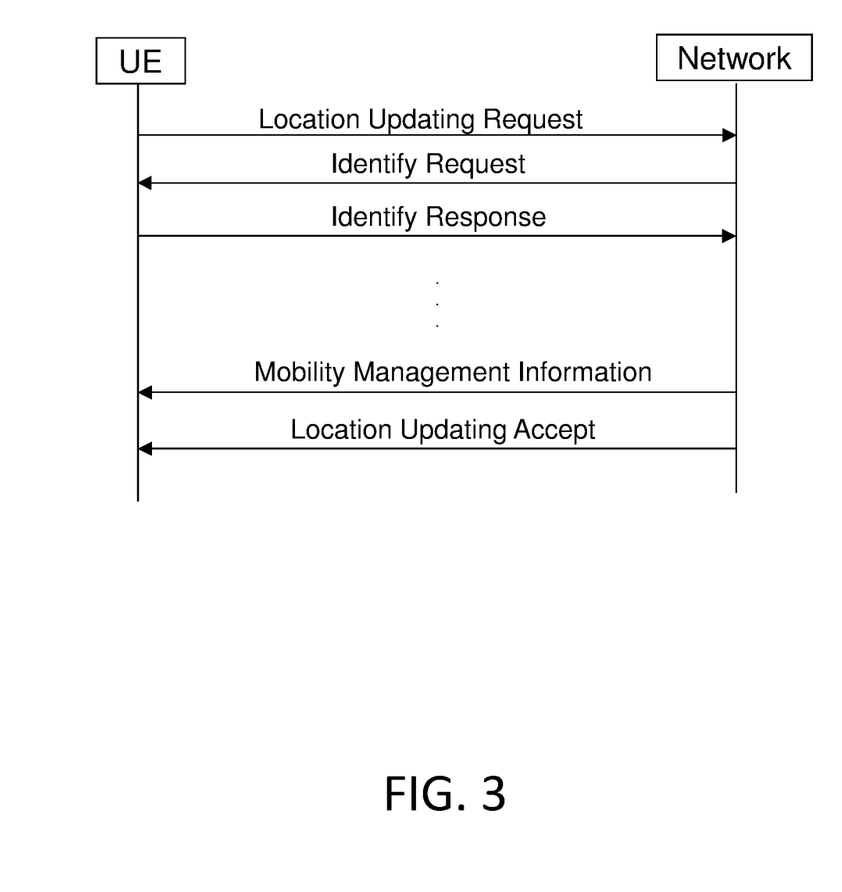
FIG. 3 is a message flow diagram illustrating a process according to an embodiment of the present disclosure.

In an embodiment of the present disclosure, a custom (full and/or short) network name to be displayed may be varied depending on the HPLMN of the mobile subscriber and SIM card associated with the UE device 30. A message flow between a roaming UE device 30 and a visited PLMN network 32 according to an embodiment of the present disclosure is illustrated in FIG. 3 and will be explained in further detail below. Some of the intervening message flows have been omitted for the sake of clarity, as illustrated by the dots between the Identify Response and Mobility Management Information messages.

When the UE 30 first powers on or enters the coverage of the VPLMN 32, it can discover the VPLMN 32 by acquiring the carrier signal of the VPLMN 32 and the UE 30 then attempts to attach to it by sending a request to update its location (such as a Location Updating Request message under UMTS® or an EMM Tracking Area Update message in the case of LTE®) to the VPLMN 32 in order to initiate the network registration procedure. This may more generally be considered to be a network registration event. As set out above, the apparatus 22 is configured to be in the communication path between the UE 30 and the VPLMN 32 and accordingly the user equipment interface 24 of the apparatus 22 is configured to receive the Location Updating Request (for UMTS®) or Tracking Area Update (for LTE®) message and to then transparently forward this onto the relevant components of the VPLMN 32 via the network interface 28 of the apparatus 22.

The VPLMN 32 may then proceed to identify the UE 30 by sending an Identify Request message to the UE 30 and waiting to receive an Identify Response message from the UE 30. The Identify Response message comprises the HNI (i.e. the MCC and the MNC) of the SIM associated with the UE 30, in particular, this is typically sent as part of the IMSI of the UE 30. Again, due to the configuration of the apparatus 22, these messages will pass transparently through the apparatus 22; however, the control logic 26 of the apparatus 22 is also configured to parse the Identify Response message to extract and/or identify the MCC and MNC pair (HNI) of the relevant UE 30 or another value that is linked to the HNI. The control logic 26 may be implemented as a processor of the apparatus 22, for example this may be a Central Processing Unit (CPU), a microprocessor, an application-specific instruction set processor (ASIP) or a field-programmable gate array (FPGA). Furthermore, the control logic may be implemented on a single processor, or the processing may be distributed across a plurality of processor components that together may be referred to as the processor.

The VPLMN 32 will then proceed with the known authentication procedure for authenticating the UE device 30 and subsequently sends a Mobility Management Information message toward the UE device 30. The apparatus 22 then intercepts the mobility management Information message and the control logic 26 dynamically modifies the short network name and/or the full network name to custom network names based on the specific HNI identified for the UE 30 from the Identify Response message. This correlation between a HNI and the custom network names to replace the short network name and/or the full network name identified in the original mobility management Information message may be obtained from a lookup table, a configuration file, a structured database or another storage element for storing the relationship between the HNI data and custom short network name and/or custom full network name data.

The modified mobility management Information message is then sent from the apparatus 22 towards the UE 30 so that the UE will be informed of the dynamic and custom network name that it should display for the VPLMN. This means that different UE devices 30 connecting to the same VPLMN 32 may receive custom mobility management Information messages causing the respective UE devices 30 to display different network names for the same VPLMN 32, based on the HNI associated with each respective UE device 30. One example advantage of this is that it enables the network name associated with a terrestrial HPLMN to be broadcast to, and displayed on, UE devices 30 in areas where the HPLMN itself is not permitted to operate (e.g. regulatory restrictions preventing terrestrial networks from operating at high altitudes).

If the VPLMN 32 does not have a stored custom network name for the extracted HNI, then it will be optional whether the mobility management Information message is sent to the UE 30 and the UE will assume that it should display a default VPLMN network name.

The VPLMN will ultimately send a Location Updating Accept/Tracking Area Update Accept message when the network registration process for the UE 30 has been completed. The structures of the above messages are described in 3GPP TS 24.008 and 3GPP TS 24.301, and the existing structure is maintained in the above embodiments in order to provide compliance with the relevant technical standards and to ensure the interoperability of a wide range of mobile devices with the apparatus 22 of the present disclosure.

As described above, the apparatus 22 may be positioned anywhere along the communication path between the UE 30 and the PLMN 32. In embodiments where multiple custom network names cannot be stored in the element manager of the Mobile Switching Centre (MSC) 20 of the VPLMN 32, the apparatus 22 may be required to modify the mobility management Information message content after it has been sent by the MSC 20 towards the UE 30.

The matching of a HNI to a custom network name assumes a given HNI (MCC and MNC pair or IMSI) is known to the apparatus 22 and has a corresponding entry in the lookup table or other corresponding data storage means. However, an alternative approach would be to blacklist certain HNIs for which the custom network name does not need to be applied.

In an embodiment where the VPLMN 32 operates a cellular network according to the Universal Mobile Telecommunications System (UMTS)® standard, the apparatus 22 may be implemented as an agent that is located in the Home Node B Gateway (HNB-GW). In such an implementation, the Virtual Network Function (VNF) may be configured at the network level in order to filter all SCTP connections and the signalling of the 3GPP TS 24.008 MM Information messages.

Alternatively, for an embodiment where the VPLMN 32 operates a cellular network according to the Long-Term Evolution (LTE)® standard, the apparatus 22 may be implemented as a corresponding agent that is run on a dedicated server, i.e. appearing as a network switch between the Mobility Management Entity (MME) and the Evolved Node B (eNodeB). This agent may then be responsible for keeping track of all connections from UE devices 30 to the PLMN 32 via SCTP, storing the HNI extracted from the corresponding 3GPP TS 24.301 EMM Identity Response messages and modifying the network name information elements in the EMM Information messages accordingly.

In one embodiment, the agent preferably keeps track of the SCTP connection stream identifier (see 3GPP TS 25.412 and IETF RFC 2960) and the full IMSI (including the HNI and the MSIN) of the UE for each UE 30 that is connected to the network. This data may be stored in a "passenger list" database table that can be cross-correlated with another database table in order to match the HNI of the IMSI to the relevant custom network name. This other database table (discussed above as a lookup table, a configuration file, a structured database, or another corresponding data storage means) may be referred to as a "custom network name" database table and may be configurable by an operator of the PLMN 32 via a user interface.

For example, a HNI of 23426 may be set to correspond to a custom network name that identifies the airline rather than an individual telecoms provider involved in the provision of the network connection. If an IMSI with an HNI of 23426 is recorded in the passenger list table, the agent will update this table with the custom network name pulled from the custom network name database table (or other storage means), for example this may be "British Airways". Alternatively, for some HNIs the apparatus may set the custom network name of the PLMN 32 to be the same as the network name of the HPLMN of the UE device 30.

When the agent detects a mobility management Information message with the corresponding UE SCTP connection, the agent replaces the network name information elements with the custom network name from the passenger list database table (or other storage means). After updating the mobility management Information message, the agent preferably purges the IMSI entry from the passenger list database table. If an entry does not exist in the custom network name database table for the HNI or IMSI, the agent preferably purges the corresponding entry from the passenger list database table without modifying the corresponding mobility management Information message for the UE device 30.

While the above implementation has been described predominantly in the context of an UMTS® network, the application of such an agent to an LTE® network would be implemented in the same manner as described above. In the case of an LTE® network, the TS 24.301 EMM messages (EMM Information and EMM Identity Response) are transported on the S1 Application Protocol (S1AP) interface between the MME and the Evolved Node B (eNodeB or eNB) with a lower layer connection being provided by SCTP.

Moreover, the skilled person will appreciate that the teaching of the present disclosure can also be applied to telecommunication protocols and network standards other than the UMTS® and/or LTE® standards. The general process typically remains very similar, with the terminology and formatting of the messages being adapted to the relevant standard.

Another approach for implementing a solution according to the present disclosure would be to create a custom network name list in the UMTS VPLMN Visitor Location Register (VLR). Upon registration of an inbound roaming UE 30, triggered by the Location Updating procedure, the VLR would look up the HNI for the UE 30 and assign a corresponding custom network name to the UE 30. The mobility management Information message would be formulated with the custom network name by the MSC 20/VLR and sent towards the UE 30. For an LTE VPLMN, the MME could be configured to perform the custom network name lookup in the same way as the UMTS VLR.

Depending on the configuration of the PLMN 32, additional security may be implemented on non-access stratum (NAS) signalling between the PLMN 32 and the UE 30. For example, some LTE® standards introduce ciphering and integrity protection for the signalling between the MME and the UE 30 in order to try and prevent man-in-the-middle attacks or other false base stations from being operated. In such embodiments, the apparatus 22 may be unable to decode the EMM Information Message (or equivalent) sent between the MME and the UE 30, and thus the ciphering and integrity protection may prevent the apparatus 22 from modifying these mobility management information messages.

Depending on the security requirements of the network, it may be possible/allowable to disable the ciphering and/or integrity protection. In the case of LTE® this could be achieved by setting a null ciphering algorithm (EEAO) for the Evolved Packet System (EPS) encryption algorithm, and/or setting a null integrity protection algorithm (EIA0) for the EPS Integrity Algorithm (EIA). This option may be particularly suitable in embodiments where the invention is implemented using a private satellite network, since this satellite network will also have its own encryption and therefore the network backhaul between the eNodeB on the aircraft 10 and the MME will still be protected.

Alternatively, the apparatus 22 may be integrated into the PLMN, for example at the MME for LTE® such that it can process the mobility management information messages prior to the stage that they are protected by any ciphering and integrity protection mechanisms.

In such an arrangement, 'standard' mobility management information messages may be generated by a given module of the MME prior to being forwarded to, and received at, the apparatus 22 (also implemented as a module of the MME) for modification to produce the modified/custom mobility management information messages based on the mobile country code and mobile network code of the UE device 30. This custom mobility management information message is produced by setting one or more network name entries of the received mobility management information message to a different network name entry bases on the mobile country code and mobile network code of the given UE device 30.

Alternatively, the apparatus 22 may be responsible for generating the 'modified' mobility management information messages—in this manner, these messages may be considered to be custom mobility management information messages that are generated with one or more network name entries that are set based on the mobile country code and mobile network code of the given UE device 30.

The embodiments of the present disclosure are well suited for specialist mobile operators (for example those operating on vessels such as cruise ships or in aircraft) where no other terrestrial mobile network operators are present. However, the embodiments would preferably need to be able to scale to handle the total volume of devices that would be present on such vessels. Since the UE devices 30 of the vast majority of passengers would automatically attach to the VPLMN 32, even if the passenger did not anticipate using the network to carry out any calls or data sessions, there would be a huge volume of simultaneous signalling to register each of the UE devices 30 to the VPLMN mobile network on board the aircraft 10.

Moreover, satellite disconnections are relatively common during an aircraft's journey and this would trigger another surge of signalling from all of the previously registered UE devices 30. In order to mitigate this surge of signalling from mass (re)registration, the 3GPP® "network overload control" feature may be configured in the agent to immediately remove any IMSI from the passenger list database table when a Mobility Management Location Updating Reject message in the case of UMTS® or EMM Tracking Area Update Reject message in the case of LTE® is detected for that IMSI.

A first type of UE device 30 may be configured to store network names received from mobility management messages so that they can be used for the duration of the, or each, connection to that VPLMN 32. Alternatively, a second type of UE device 30 may require each and every mobility management message that is received for the duration of the, or each, connection to/session with the VPLMN 32 to include the network name so that this can continue to be available for display at the UE device 30. For this second type of device, the UE device 30 may revert to displaying a network name stored in a carrier profile from the UE device or stored in a SIM card of the UE device if an expected mobility management information message is not received, or if it is received but not contain the network name information element(s).

In view of this, the apparatus of the present disclosure may optionally be modified to monitor an identification (for example the IMSI) of the UE devices 30 that the apparatus 22 has sent at least one mobility management information message to (possibly for a given session) and to then handle subsequent mobility management information messages differently in accordance with the nature of the identified device. For example, the apparatus 22 may store or access a database linking IMSI numbers to corresponding device model numbers and/or hardware configurations such that it can be determined whether the UE device in question is of the first type or the second type mentioned above.

In this manner, an embodiment of the apparatus 22 may optionally be configured to send only a single custom mobility management information message to UE devices 30 that are identified to be of the first type and be configured to send a first and subsequent custom mobility management information messages to UE devices 30 that are identified to be of the second type. This enables the apparatus to reduce the amount of throughput and processing required for the handling of UE devices of the first type and therefore increases the efficiency and capacity of the apparatus 22. In particular, subsequent mobility management information messages received from a MSC 20 or MME and intended for a UE device 30 of the first type may be filtered out and/or not forwarded to the UE device 30 in order to avoid the processing the mobility management information message to add the custom (long and/or short) network name to the message for these devices of the first type that have already been handled by the apparatus 22.

An example IMEI database is the GSMA IMEI database <https://imeidb.gsma.com/imei/index>, which stores a correlation between a given IMEI and the manufacturer and model name of the UE devices that are known to have been linked to that IMEI. This database could be supplemented or linked to a list of UE device models that are known to be of either the first or the second type. As such, the apparatus can use this correspondence to determine how mobility management information messages should be handled when it has been recorded that a first mobility management information message has already been sent with the custom network name for that HNI/IMEI in that connection session.

As will be appreciated by the skilled person, the subject matter described herein may be embodied in whole or in part as a method, a data processing system, or a computer program product including computer readable instructions. Accordingly, the subject matter of the present disclosure may take the form of an entirely hardware embodiment, an entirely software embodiment, or an embodiment combining software, firmware, hardware and/or any other suitable approach or apparatus.

Any computer readable program instructions may be stored on a non-transitory, tangible computer readable medium. The computer readable storage medium may include one or more of an electronic storage device, a magnetic storage device, an optical storage device, an electromagnetic storage device, a semiconductor storage device, a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk.

Because some embodiments of the present invention require the message flow between the UE device 30 and the VPLMN 32 to pass through the apparatus 22 so that the signalling traffic can be parsed and modified (i.e. those where the apparatus 22 is not integrated into the MME/MSC 20/VPLMN 32), this will introduce a single point of failure between the base station 12 in the aircraft 10 and the ground infrastructure of the VPLMN 32. In order to mitigate this single point of failure, the agent apparatus 22 may be arranged in a redundant set up with one or more further apparatuses 22. This may be implemented on two separate servers in an active-active failover set up such that, if one server failed, the other server would take over the processing of all signalling traffic.

It is also worth noting that 3GPP® signalling messages typically have an associated timer at the end of which messages are retransmitted if a required reply has not been received. Where the embodiments of the present disclosure are likely to rely on satellite data connections, it would be typical for latencies of around 350 ms to be experienced for geo-stationary satellites and this may be much higher if there is a poor connection, for example due to thick cloud cover. This means that the messages are often retransmitted and accordingly it is highly preferable that the apparatus 22 of the present invention does not add any significant additional delay to the message transfer due to the parsing and registering of UE device IMSIs and modifying the corresponding mobility management Information message content. The corresponding additional delay caused by the apparatus 22 may be minimised by providing the apparatus 22 with ample processing power and memory capacity on the server in which the apparatus 22 is running.

Figure 4:
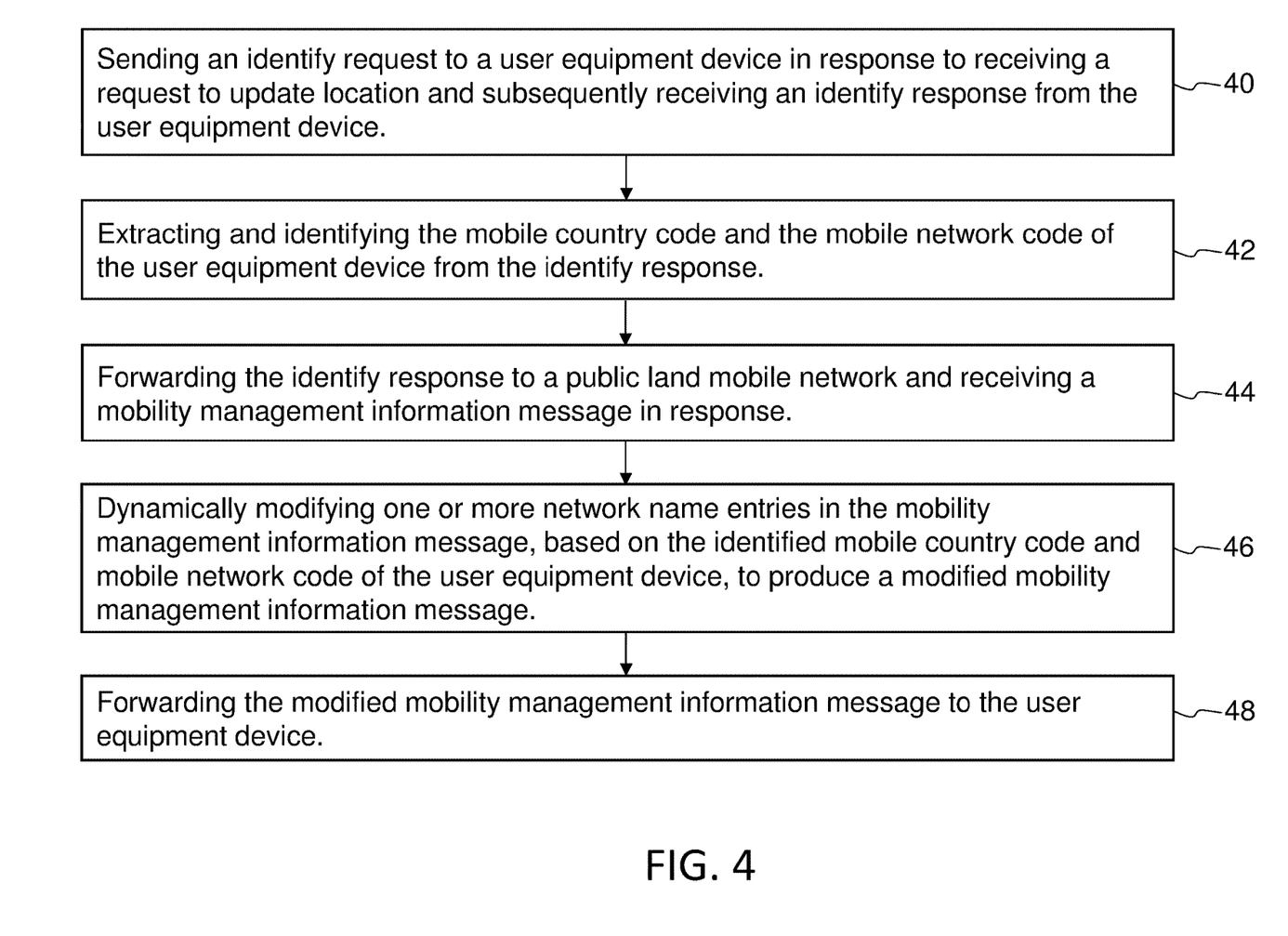
FIG. 4 is a flowchart illustrating a method for controlling telecommunication signalling according to an aspect of the present disclosure.

FIG. 4 is a flowchart illustrating a method for controlling telecommunication signalling according to a further aspect of the present disclosure. At step 40, the method comprises sending, from a user equipment interface, an identify request to a user equipment device in response to receiving a request to update location, and subsequently receiving an identify response, at the user equipment interface, from the user equipment device.

At step 42, the method comprises extracting and identifying, by a control logic, the mobile country code and the mobile network code of the user equipment device from the identify response, and then at step 44 the method further comprises forwarding, from a network interface, the identify response to a public land mobile network and receiving a mobility management information message in response.

In step 46, the method comprises dynamically modifying, by the control logic, one or more network name entries in the mobility management information message, based on the identified mobile country code and mobile network code of the user equipment device, to produce a modified mobility management information message. Finally, in step 48, the method comprises the user equipment interface forwarding the modified mobility management information message to the user equipment device.

For completeness, it is noted that the flowcharts of FIG. 4 illustrates the operation of an example implementation of the method according to the present disclosure. Each block in the flowchart may represent a module comprising one or more executable computer instructions, or a portion of an instruction, for implementing the relevant logical function specified in the block. The order of blocks in FIG. 4 is only intended to be illustrative of an example. In alternative implementations, the logical functions illustrated in particular blocks may occur out of the order noted in FIG. 4. For example, the processes associated with two blocks may be carried out simultaneously or, depending on the functionality, in the reverse order. In particular, the skilled person will appreciate that step 46 may be performed at the same time as, or before, step 44. Moreover, each block in the flowchart may be implemented in software, hardware or a combination of software and hardware.

As set out with respect to the apparatus 22 above, the method may also be carried out using a control logic and a user equipment interface that is integrated into the PLMN 32, for example by integrating the apparatus 22 into the MSC 20, the MME or a corresponding component of the PLMN 32. In this embodiment, the method may set one or more network name entries in the mobility management information message, based on the identified representation of the mobile country code and mobile network code of the user equipment device, to produce a custom mobility management information message, rather than receiving an original mobility management information message and then modifying it to produce the custom mobility management information message.

In a further aspect of the present disclosure, a standards-based approach may be used to achieve the aims of the present disclosure; however, it will be appreciated that this would require an update to telecommunications standards themselves, such as the 3GPP® specifications. One method for standardising this solution would be for the HPLMN to signal the network name for display when roaming in a given VPLMN to the UE devices 30 of their subscribers. The HPLMN could be mandated to send this information if the VPLMN requests the information upon registering the subscriber's UE device 30 to its VPLMN network.

For UMTS® type networks (e.g. GERAN/UTRAN), the VPLMN could send a request for a custom network name in the MAP_Update_Location_Request message for a given subscriber associated with the UE device 30 (for example by the IMSI or HNI associated with the UE device 30). The HPLMN could then include the custom network name in the MAP_Update_Location_Response message, which is currently sent in accordance with 3GPP TS 29.002 Release 10.

This may be achieved by adding a new pair of information elements for the request and response parameters for the custom network names to the MAP_Update_Location message from 3GPP TS 29.002 Table 8.1/2. The new information element added to the Update Location Request signals to the HPLMN an indicator for the HPLMN to provide a custom network name to the VPLMN and the new information element added to the Update Location Response signals for the HPLMN to provide the VPLMN with a full and/or short network name (which may use the existing format specified in 3GPP TS 24.008 Release 15, sub clause 10.5.3.5a.

Alternatively, the HPLMN could send the custom network name in the MAP Insert Subscriber Data message that is sent towards the VPLMN. This may be achieved by adding a new pair of information elements for the request and response parameters for the custom network names to the MAP_INSERT_SUBSCRIBER_DATA message from 3GPP TS 29.002 Table 8.8/1. The MAP Insert Subscriber Data message with the new information element is sent from the HPLMN to the VPLMN containing the custom network name. This new information element may also be formatted in the same way as that specified in the existing 3GPP TS 24.008 Release 15, sub clause 10.5.3.5a. With this approach, the VPLMN can optionally send a confirmation to the HPLMN that the network name has been received.

Once the VPLMN receives the network name information, the MSC 20 may then be configured to include the full and/or short network names received from the HPLMN in the mobility management information messages sent from the MSC 20 to the UE device 30.

As will be appreciated by the skilled person, this teaching may also be adapted to alternative telecommunications protocols without departing from the scope of the present disclosure.

The invention claimed is:

1. An apparatus for controlling telecommunication signalling, comprising:
    at least one processor;
    a user equipment interface configured to, under the control of the at least one processor, send an identify request to a user equipment device in response to receiving a request to update location and to subsequently receive an identify response from the user equipment device; and
    control logic configured to, via the at least one processor, extract and identify a representation of a mobile country code and a mobile network code of the user equipment device from the identify response;
    wherein the control logic is further configured to, via the at least one processor, set one or more network name entries in a mobility management information message, based on the identified representation of the mobile country code and mobile network code of the user equipment device, to produce a custom mobility management information message; and
    wherein the user equipment interface is further configured to, under the control of the at least one processor, forward the custom mobility management information message to the user equipment device.

2. The apparatus of claim 1, wherein the control logic is configured to, via the at least one processor, set the one or more network name entries in the custom mobility management information message based on the identified representation of the mobile country code and mobile network code of the user equipment device using a lookup table or a configuration file.

3. The apparatus of claim 1, wherein the control logic is further configured to, via the at least one processor, monitor an identification of the user equipment device and to perform a lookup of the identification of the user equipment device in a database or a configuration file to determine whether the user equipment device is associated with a first type or a second type;
    wherein the user equipment interface is configured to send, under the control of the at least one processor and for a given telecommunication signalling session, only one custom mobility management information message to a user equipment device determined to be associated with the first type; and wherein the user equipment interface is configured to, under the control of the at least one processor, send a plurality of custom mobility management information messages, throughout a given telecommunication signalling session, to a user equipment device determined to be associated with the second type.

4. The apparatus of claim 1, wherein the one or more network name entries in the custom mobility management information message comprise a short network name and a full network name.

5. The apparatus of claim 1, wherein producing the custom mobility management information message comprises:

forwarding, from a network interface, the identify response to a public land mobile network;

receiving, at the network interface, a mobility management information message in response; and modifying one or more network name entries in the mobility management information message, based on the identified representation of the mobile country code and mobile network code of the user equipment device, to produce the custom mobility management information message.

6. The apparatus of claim 5, wherein the public land mobile network is a visited public land mobile network.

7. The apparatus of claim 6, wherein the visited public land mobile network is configured to provide telecommunication service on an aircraft and/or a cruise ship.

8. The apparatus of claim 5, wherein the apparatus is configured to, under the control of the at least one processor, receive and modify mobility management information messages at a network level.

9. The apparatus of claim 1, wherein the apparatus forms part of a network switch or forms part of a visitor location register for a network base station or forms part of a mobility management entity.

10. A method for controlling telecommunication signalling, comprising:

sending an identify request to a user equipment device in response to receiving a request to update location and subsequently receiving an identify response from the user equipment device;

extracting and identifying a representation of a mobile country code and a mobile network code of the user equipment device from the identify response; and setting one or more network name entries in a mobility management information message, based on the identified representation of the mobile country code and mobile network code of the user equipment device, to produce a custom mobility management information message; and forwarding the custom mobility management information message to the user equipment device.

11. The method of claim 10, wherein a lookup table or a configuration file is used for setting the one or more network name entries in the custom mobility management information message based on the identified representation of the mobile country code and mobile network code of the user equipment device.

12. The method of claim 10, further comprising monitoring an identification of the user equipment device and performing a lookup of the identification of the user equipment device in a database or a configuration file to determine whether the user equipment device is associated with a first type or a second type; and if the user equipment device is determined to be associated with the first type, forwarding only one custom mobility management information message, during a given telecommunication signalling session, to the user equipment device; or if the user equipment device is determined to be associated with the second type, forwarding a plurality of custom mobility management information messages, throughout a given telecommunication signalling session, to the user equipment device.

13. The method of claim 10, wherein the one or more network name entries in the custom mobility management information message comprise a short network name and a full network name.

14. The method of claim 10, setting one or more network name entries in the mobility management information message comprises:

forwarding the identify response to a public land mobile network;

receiving a mobility management information message in response; and modifying one or more network name entries in the mobility management information message, based on the identified representation of the mobile country code and mobile network code of the user equipment device, to produce the custom mobility management information message.

15. The method of claim 14, wherein the public land mobile network is a visited public land mobile network.

16. The method of claim 15, wherein the visited public land mobile network provides telecommunication service on an aircraft and/or a cruise ship.

17. The method of claim 14, wherein the mobility management information messages are received and modified at a network level.

18. The method of claim 10, wherein the method is implemented in a network switch or in a visitor location register for a network base station or in a mobility management entity.

19. A system for controlling telecommunication signalling, comprising:

a first apparatus comprising:

at least one processor;

a user equipment interface configured to, under the control of the at least one processor, send an identify request to a user equipment device in response to receiving a request to update location and to subsequently receive an identify response from the user equipment device; and control logic configured to, via the at least one processor, extract and identify a representation of a mobile country code and a mobile network code of the user equipment device from the identify response;

wherein the control logic is further configured to, via the at least one processor, set one or more network name entries in a mobility management information message, based on the identified representation of the mobile country code and mobile network code of the user equipment device, to produce a custom mobility management information message; and wherein the user equipment interface is further configured to, under the control of the at least one processor, forward the custom mobility management information message to the user equipment device.

20. The system of claim 19, further comprising a second apparatus configured to operate as a redundant backup for the first apparatus.

\* \* \* \* \*